(12) United States Patent
Rosenstock et al.

(10) Patent No.: US 7,185,025 B2
(45) Date of Patent: Feb. 27, 2007

(54) SUBNET REPLICATED DATABASE ELEMENTS

(75) Inventors: Harold N. Rosenstock, Boxborough, MA (US); Richard Dykiel, Acton, MA (US); Michael Leibensperger, Somerville, MA (US); Nehru Bhandaru, Sudbury, MA (US)

(73) Assignee: Motorola, Inc., Schaumburg, IL (US)

( * ) Notice: Subject to any disclaimer, the term of this patent is extended or adjusted under 35 U.S.C. 154(b) by 402 days.

(21) Appl. No.: 10/676,484

(22) Filed: Sep. 30, 2003
(Under 37 CFR 1.47)

(65) Prior Publication Data
US 2005/0071381 A1    Mar. 31, 2005

(51) Int. Cl.
*G06F 17/30* (2006.01)
(52) U.S. Cl. ..................................... 707/200
(58) Field of Classification Search ............. 707/1–10, 707/100–104.1, 200–206; 709/223, 226; 714/5
See application file for complete search history.

(56) References Cited

U.S. PATENT DOCUMENTS

2005/0071452 A1* 3/2005 Rosenstock et al. ........ 709/223

2005/0071709 A1* 3/2005 Rosenstock et al. ........... 714/5

OTHER PUBLICATIONS

"InfiniBand™ Architecture Specification vol. 1", Release 1.1, Copyright © 1999, 2001, 2002 by InfiniBand℠ Trade Association, Nov. 6, 2002 Final pp. 1-35, 54-57, 61-80, 89-90, 121-124, 628-632, 682-684, 706, 758-766, 826.

* cited by examiner

*Primary Examiner*—Diane D. Mizrahi
(74) *Attorney, Agent, or Firm*—Kevin D. Wills (57) ABSTRACT

Replicating database elements in an InfiniBand® architecture subnet includes a master subnet manager function updating database elements of an InfiniBand® architecture subnet. A replicated set of the database elements is created at each of a set of standby subnet managers using the InfiniBand® architecture subnet. A standby subnet manager included in the set of standby subnet managers assumes the master subnet manager function after the master subnet manager function has been relinquished. The standby subnet manager included in the set of standby managers that assumes the master subnet manager function uses the replicated set of the database elements to manage the InfiniBand® architecture subnet.

40 Claims, 8 Drawing Sheets

SUBNET REPLICATED DATABASE ELEMENTS

RELATED CASES

Related subject matter is disclosed in U.S. patent application entitled "METHOD OF MIGRATING ACTIVE GENERAL SERVICE MANAGER FUNCTION" having application Ser. No. 10/676,948 and filed on the same date herewith and assigned to the same assignee.

Related subject matter is disclosed in U.S. patent application entitled "METHOD AND APPARATUS FOR LIMITING STANDBY SUBNET MANAGERS" having application Ser. No. 10/676,744 and filed on the same date herewith and assigned to the same assignee.

Related subject matter is disclosed in U.S. patent application entitled "METHOD OF REPLICATING DATABASE ELEMENTS IN AN INFINIBAND® ARCHITECTURE SUBNET" having application Ser. No. 10/676,991 and filed on the same date herewith and assigned to the same assignee.

Related subject matter is disclosed in U.S. patent application entitled "INFINIBAND® ARCHITECTURE SUBNET DERIVED DATABASE ELEMENTS" having application Ser. No. 10/676,746 and filed on the same date herewith and assigned to the same assignee.

BACKGROUND OF THE INVENTION

In InfiniBand® architecture networks virtually all failover and database replication is left beyond the scope of the InfiniBand® architecture specification. Currently, the only mechanism specified is the master subnet manager handover/failover. Therefore, the prior art is devoid of mechanisms and algorithms to allow the graceful failover amongst nodes in an InfiniBand® network. The prior art is also devoid of a practical and efficient means of database replication to allow a graceful failover to occur.

Accordingly, there is a significant need for an apparatus and method that overcomes the deficiencies of the prior art outlined above.

BRIEF DESCRIPTION OF THE DRAWINGS

Referring to the drawing.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, software blocks, structures and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact. However, "coupled" may mean that two or more elements are not in direct contact with each other, but yet still co-operate or interact with each other.

For clarity of explanation, the embodiments of the present invention are presented, in part, as comprising individual functional blocks. The functions represented by these blocks may be provided through the use of either shared or dedicated hardware (processors, memory, and the like), including, but not limited to, hardware capable of executing software. The present invention is not limited to implementation by any particular set of elements, and the description herein is merely representational of one embodiment.

InfiniBand® architecture is an interconnect technology for interconnecting processor nodes and input/output (I/O) nodes to form a system area network. InfiniBand® architecture is independent of the host operating system (OS) and processor platform. InfiniBand® architecture is a point-to-point switched fabric where end nodes are interconnected by one or more cascaded switches and/or routers.

Figure 1:
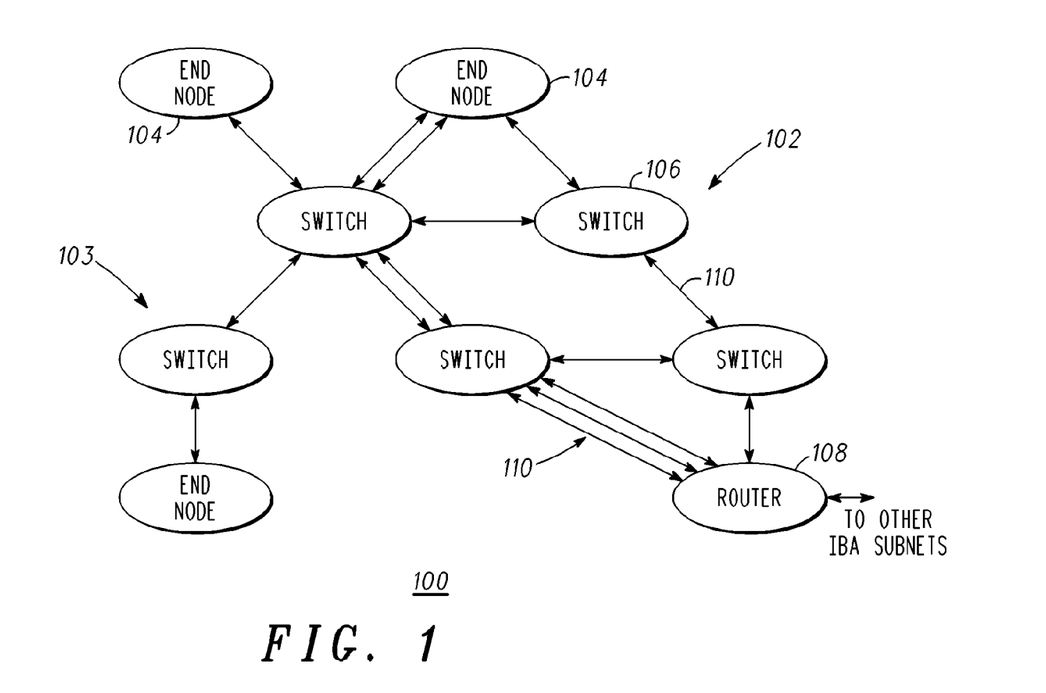
FIG. 1 depicts an InfiniBand® architecture subnet according to one embodiment of the invention.

FIG. 1 depicts an InfiniBand® architecture subnet 100 according to one embodiment of the invention. An InfiniBand® architecture subnet 100 is specified by the InfiniBand® Architecture Specification, Release 1.1 or later, as promulgated by the InfiniBand®™ Trade Association, 5440 SW Westgate Drive, Suite 217, Portland, Oreg. 97221. InfiniBand® architecture subnet 100 can include a plurality of nodes 102 arranged and connected in any topology 103.

Each of plurality of nodes is an InfiniBand® architecture subnet node. Plurality of nodes 102 can include any number of end nodes 104, switches 106 or routers 108 coupled by bi-directional links 110. In an embodiment, there can be more than one bi-directional link 110 between nodes.

End nodes 104 can include processor nodes, storage nodes, I/O nodes, Redundant Array of Independent Disks (RAID) subsystems, and the like. Switches provide for communication between nodes in InfiniBand® architecture subnet 100. Router 108 provide for communication between any number of InfiniBand® architecture subnets. Each connection between plurality of nodes 102 is a point-to-point serial connection. Data exchanged in InfiniBand® architecture subnet 100 can be in the form of packets, which can generally comprise a header portion that instructs a switch 106 as to the destination of the packet.

As described above, InfiniBand® architecture subnet 100 can be based on a point-to-point, switched input/output (I/O) fabric, whereby switches 106 interconnect end nodes 104. InfiniBand® architecture subnet 100 can include both module-to-module (for example computer systems that support I/O module add-in slots) and chassis-to-chassis environments (for example interconnecting computers, external storage systems, external Local Area Network (LAN) and Wide Area Network (WAN) access devices in a data-center environment).

Figure 2:
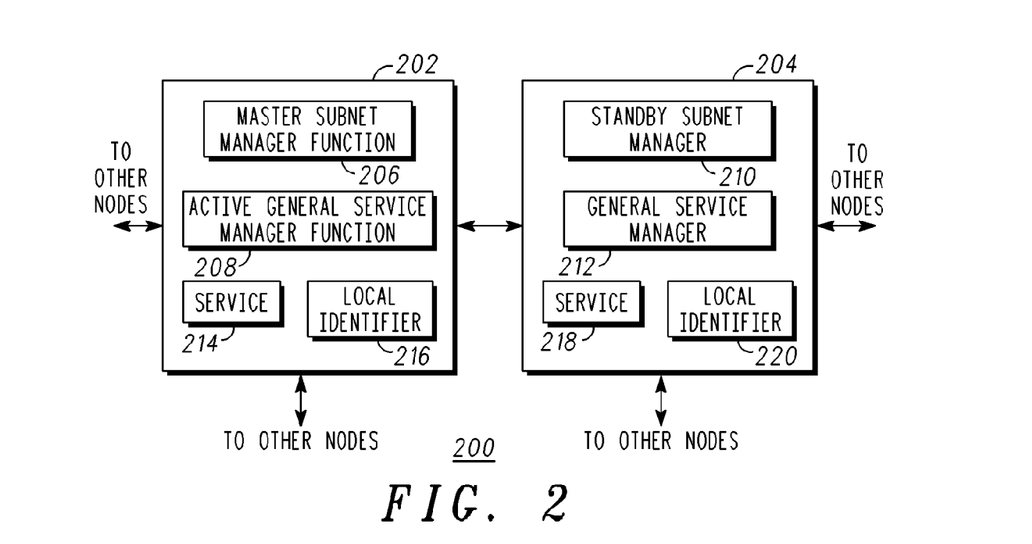
FIG. 2 depicts an InfiniBand® architecture subnet according to another embodiment of the invention.

FIG. 2 depicts an InfiniBand® architecture subnet 200 according to another embodiment of the invention. In the embodiment depicted in FIG. 2, only two nodes are shown. However, InfiniBand® architecture subnet 200 can include any number of nodes. InfiniBand® architecture subnet 200 has at least one subnet manager, which can reside on a port, switch, router, end node, and the like. In another embodiment, subnet manager can be distributed among any number of nodes. Subnet manager can be implemented in hardware or software. When there are multiple subnet managers in InfiniBand® architecture subnet 200, one subnet manager will include master subnet manager function 206 and any other subnet managers within InfiniBand® architecture subnet 200 may become a standby subnet manager 210.

InfiniBand® architecture subnet 200 can include any number of general service managers 212 at a node. A general service manager 212 can manage a service 214, 218 within InfiniBand® architecture subnet 200. In an embodiment, there can be different types of services in InfiniBand® architecture subnet 200. For each type of service in InfiniBand® architecture subnet 200, there is an active general service manager function 208 manifested at a general service manager.

An exemplary service can include performance management service that enables a general service manager 212 to retrieve performance statistics and error information from components in InfiniBand® architecture subnet 200. In this embodiment, a general service manager can be a performance manager. In another exemplary embodiment, service 214, 218 can include baseboard management service that provides a means to transport messages to components not included in InfiniBand® architecture subnet 200 (i.e. "out of band" components). In this embodiment, a general service manager can be a baseboard manager. Other services and general service managers are included within the scope of the invention. In an embodiment, a service 214, 218 and its corresponding general service manager 212 can be mandatory on a node. In another embodiment, a service 214, 218 and its corresponding general service manager 212 can be optional on a node.

Each node within InfiniBand® architecture subnet 200 includes local identifier (LID) 216, 220. Local identifier 216, 220 can be a 16-bit identifier (address) that is subnet unique. In other words, each node or port in InfiniBand® architecture subnet 200 can have a unique local identifier 216, 220 so that packets traveling within InfiniBand® architecture subnet 200 can be addressed to specific nodes or ports. In an embodiment, local identifier 216, 220 does not apply outside of InfiniBand® architecture subnet 200 or within other subnets. Local identifier 216, 220 is unique only for InfiniBand® architecture subnet 200.

In the embodiment shown in FIG. 2, first node 202 includes master subnet manager function 206, which can be manifested at a subnet manager (not shown) at first node 202. In effect, a subnet manager at first node 202 has the master subnet manager function 206 in InfiniBand® architecture subnet 200. In an embodiment, master subnet manager function 206 manages InfiniBand® architecture subnet 200 and can initialize and configure InfiniBand® architecture subnet 200. This can include discovering a topology 103 of InfiniBand® architecture subnet 200, establishing possible paths among end nodes 104, assigning local identifier 216, 220 to each node in InfiniBand® architecture subnet 200, sweeping the subnet and discovering and managing changes in topology 103 of InfiniBand® architecture subnet 200, and the like. Also included at first node 202 is active general service manager function 208, which can be manifested at a general service manager (not shown) at first node 202. In an embodiment, active general service manager function 208 can manage service 214, 218 in InfiniBand® architecture subnet 200.

In the embodiment shown, second node 204 includes standby subnet manager 210 and general service manager 212. Standby subnet manager 210 does not manage InfiniBand® architecture subnet 200 and general service manager does not manage service 214, 218. In an embodiment the invention, master subnet manager function 206 can migrate to second node where standby subnet manager 210 assumes master subnet manager function 206. At this point, standby subnet manager 210 ceases being a standby subnet manager.

In this embodiment, active general service manager function 208 migrates to second node to co-locate with master subnet manager function 206 where general service manager 212 assumes active general service manager function 208. In an embodiment, active general service manager function 208 can detect the change in local identifier corresponding to the location of master subnet manager function 206. For example, active general service manager function 208 can detect that local identifier 216 is no longer associated with master subnet manager function 206 and that local identifier 220 is now associated with master subnet manager function 206. In another embodiment, master subnet manager function 206 can inform (via local event) active general service manager function 208 about the migration to second node 204. Master subnet manager function 206 can inform either "inband" (over InfiniBand® architecture subnet 200) or "out of band (using a mechanism other than InfiniBand® architecture subnet 200, such as Ethernet, shared memory based inter-process communication, any other network technology other than InfiniBand® architecture, and the like).

In effect, active general service manager function 208 follows migration of master subnet manager function 206 within InfiniBand® architecture subnet 200. In this way, active general service manager function 208 follows master subnet manager function 206 within InfiniBand® architecture subnet 200 such that active general service manager function 208 is at the same node as master subnet manager function 206.

Figure 3:
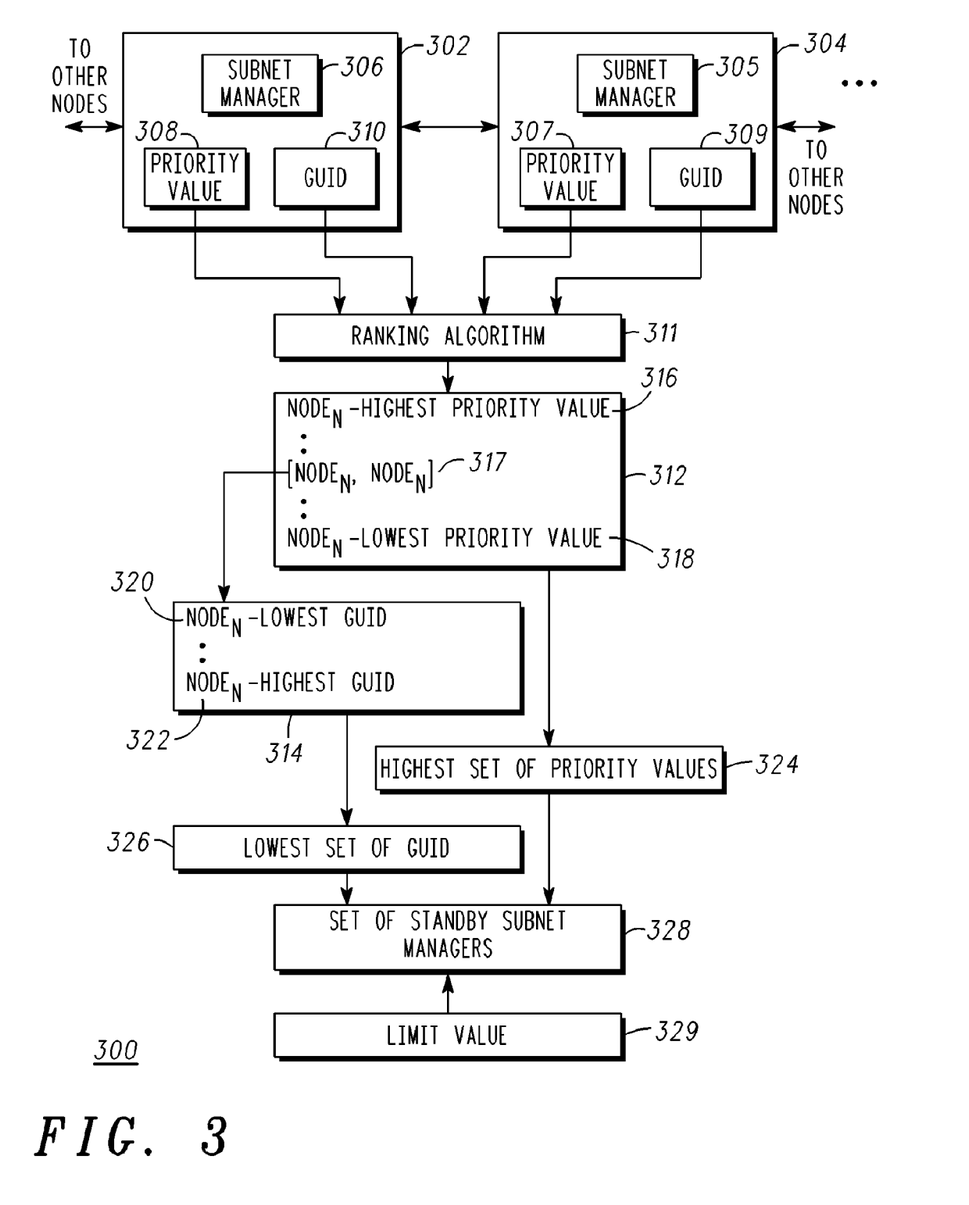
FIG. 3 depicts a block diagram of an InfiniBand® architecture subnet according to an embodiment of the invention.

FIG. 3 depicts a block diagram of an InfiniBand® architecture subnet 300 according to an embodiment of the invention. In the embodiment depicted in FIG. 3, only two nodes are shown. However, InfiniBand® architecture subnet 300 can include any number of nodes.

In an embodiment, each node in InfiniBand® architecture subnet 300 can include subnet manager 305, 306, priority value 307, 308 and globally unique identifier (GUID) 309, 310. In an embodiment, priority value 307, 308 is a four-bit administered field that can be modified by an InfiniBand® architecture subnet administrator. Priority value 307, 308 can be set to reflect the relative importance or lack of importance of a particular node in InfiniBand® architecture subnet 300. In an embodiment, globally unique identifier 309, 310 can be a 64-bit assigned identifier (address) that is unique (32-bits can be IEEE assigned and the other 32-bits can be manufacturer assigned) and restricted to being globally unique. In other words, each node in InfiniBand® architecture subnet 300 has at least one globally unique identifier 309, 310 that is unique across the InfiniBand® architecture subnet 300 and any other InfiniBand® architecture subnets whether coupled to InfiniBand® architecture subnet 300 through a router.

In an embodiment, first node includes subnet manager 306, priority value 308 and globally unique identifier 310. Second node 304 includes subnet manager 305, priority value 307 and globally unique identifier 309. In an embodiment, InfiniBand® architecture subnet 300 includes ranking algorithm 311 to select which of the subnet managers in InfiniBand® architecture subnet 300 are included in set of standby subnet managers 328.

In an embodiment, ranking algorithm 311 creates priority value ranking set 312 where plurality of nodes and their corresponding subnet managers in InfiniBand® architecture subnet 300 are ranked according to their respective priority values. Node$_N$ represents a node in InfiniBand® architecture subnet 300. In the embodiment shown, each node is ranked from highest priority value 316 to lowest priority value 318.

In the event that, for example and without limitation, priority value 308 of first node 302 is identical to priority value 307 of second node 304, an identical priority value set 317 can be created that includes first node 302 and second node 304. In an embodiment, an identical priority value set 317 can be created for each group of nodes that have identical priority values. In an embodiment, each identical priority value set 317 can be further ranked from a lowest globally unique identifier 320 to a highest globally unique identifier 322 in globally unique identifier ranking set 314.

In an embodiment, set of standby subnet managers 328 can be selected based on the priority value and the globally unique identifier of each of the plurality of nodes in InfiniBand® architecture subnet 300. For example, and without limitation, a limit value 329 can be placed on the quantity of subnet managers in InfiniBand® architecture subnet 300 that can be selected to be in set of standby subnet managers 328. If the number of active subnet managers in InfiniBand® architecture subnet 300 is greater than the limit value 329, then set of standby subnet managers 328 can be selected based on the priority value and, if necessary, the globally unique identifier of each of the plurality of nodes in InfiniBand® architecture subnet 300. In this embodiment, any subnet managers that are not included in set of standby subnet managers can be made inactive. The deactivation can either be local or controlled by the master subnet manager function. If there are fewer active subnet managers in InfiniBand® architecture subnet 300 than limit value 329, then additional subnet managers can be made active (if available on the subnet) and included in set of standby subnet managers 328. Reactivation can be accomplished either using the master subnet manager function over InfiniBand® architecture subnet 300 or out of band over a communication means other than InfiniBand® architecture subnet 300. In an embodiment, both deactivation and reactivation of subnet managers can be accomplished using standard InfiniBand® architecture mechanisms.

In an embodiment, subnet managers can be selected to be one of set of standby subnet managers 328 by selecting the subnet manager from each of the plurality of nodes with a highest set of priority values 324. The highest set of priority values 324 can include nodes and respective subnet managers, up to the limit value 329, having the highest priority values in priority value ranking set 312. If, for example, all of priority values in highest set of priority values 324 up to limit value 329 are unique, then each subnet manager and corresponding node can be included in set of standby subnet managers 328. In this embodiment, GUID of any of the subnet managers do not need to be ranked.

In another embodiment, if, highest set of priority values 324 includes identical priority value set 317, where all of nodes in identical priority value set 317 can be included in highest set of priority values 324 and set of standby subnet managers 328 without exceeding limit value 329, then no further ranking of identical priority value set 317 is necessary. In this case, each subnet manager and corresponding node in identical priority value set 317 can be included in set of standby subnet managers 328.

In still another embodiment, highest set of priority values 324 can include an identical priority value set 317 that has a priority value and a number of nodes such that all of the nodes in identical priority value set 317 cannot be included in highest set of priority values 324 without violating limit value 329 (i.e. a priority value of identical priority value set 317 is at the cut-off point for highest set of priority values 324). In this embodiment, subnet managers and corresponding nodes in identical priority value set 317 can be further ranked from lowest GUID 320 to highest GUID 322 in globally unique identifier ranking set 314. Subnet managers can then be further selected from the globally unique identifier ranking set 314 to be included in set of standby subnet managers 328 by selecting the subnet manager from each of the plurality of nodes within globally unique identifier ranking set 314 having a lowest set of globally unique identifiers 326 until limit value 329 is reached.

Once set of standby subnet managers 328 is selected, which standby subnet manager that assumes master subnet manager function 206 can be selected based on the master subnet manager function handover/failover mechanism described in InfiniBand® Architecture specification release 1.1 or later. Any other algorithm can be used to select which of set of standby subnet managers assume master subnet manager function and still be within the scope of the invention.

Figure 4:
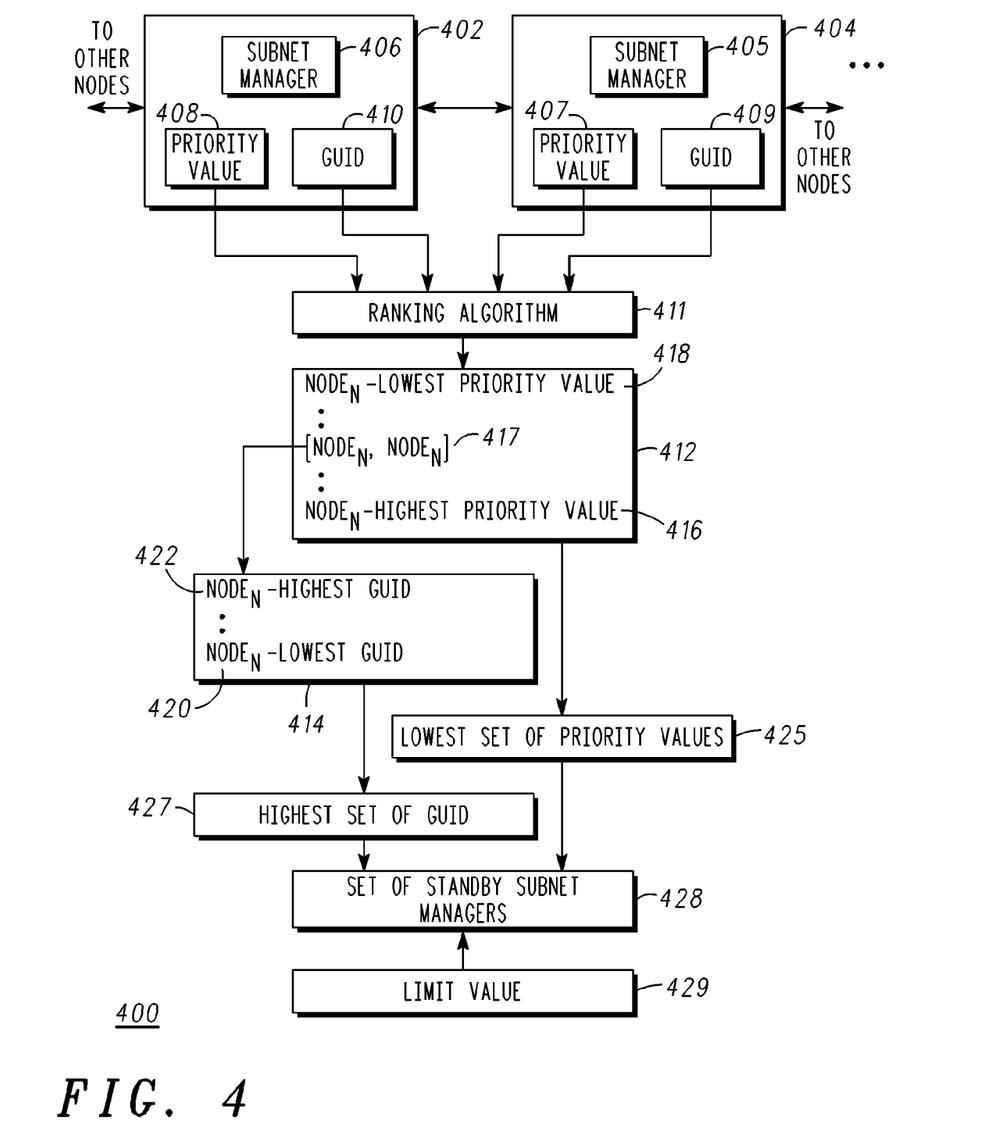
FIG. 4 depicts a block diagram of an InfiniBand® architecture subnet according to another embodiment of the invention.

FIG. 4 depicts a block diagram of an InfiniBand® architecture subnet 400 according to another embodiment of the invention. In the embodiment depicted in FIG. 4, only two nodes are shown. However, InfiniBand® architecture subnet 400 can include any number of nodes.

In an embodiment, first node includes subnet manager 406, priority value 408 and globally unique identifier 410. Second node 404 includes subnet manager 405, priority value 407 and globally unique identifier 409. In an embodiment, InfiniBand® architecture subnet 400 includes ranking algorithm 411 to select which of the subnet managers in InfiniBand® architecture subnet 400 are included in set of standby subnet managers 428.

In an embodiment, ranking algorithm 411 creates priority value ranking set 412 where plurality of nodes and their corresponding subnet managers in InfiniBand® architecture subnet 400 are ranked according to their respective priority values. Node$_N$ represents a node in InfiniBand® architecture subnet 400. In the embodiment shown, each node is ranked from lowest priority value 418 to highest priority value 416.

In the event that, for example and without limitation, priority value 408 of first node 402 is identical to priority value 407 of second node 404, an identical priority value set 417 can be created that includes first node 402 and second node 404. In an embodiment, an identical priority value set 417 can be created for each group of nodes that have identical priority values. In an embodiment, each identical priority value set 417 can be further ranked from a highest globally unique identifier 422 to a lowest globally unique identifier 420 in globally unique identifier ranking set 414.

In an embodiment, set of standby subnet managers 428 can be selected based on the priority value and the globally unique identifier of each of the plurality of nodes in InfiniBand® architecture subnet 400. For example, and without limitation, a limit value 429 can be placed on the quantity of subnet managers in InfiniBand® architecture subnet 400 that can be selected to be in set of standby subnet managers 428. If the number of active subnet managers in InfiniBand® architecture subnet 400 is greater than the limit value 429, then set of standby subnet managers 428 can be selected based on the priority value and, if necessary, the globally unique identifier of each of the plurality of nodes in InfiniBand® architecture subnet 400. In this embodiment, any subnet managers that are not included in set of standby subnet managers can be made inactive. The deactivation can either be local or controlled by the master subnet manager function. If there are fewer active subnet managers in InfiniBand® architecture subnet 400 than limit value 429, then additional subnet managers can be made active (if available on the subnet) and included in set of standby subnet managers 428. Reactivation can be accomplished either using the master subnet manager function over InfiniBand® architecture subnet 400 or out of band over a communication means other than InfiniBand® architecture subnet 400. In an embodiment, both deactivation and reactivation of subnet managers can be accomplished using standard InfiniBand® architecture mechanisms.

In an embodiment, subnet managers can be selected to be one of set of standby subnet managers 428 by selecting the subnet manager from each of the plurality of nodes with a lowest set of priority values 425. The lowest set of priority values 425 can include nodes and respective subnet managers, up to the limit value 429, having the lowest priority values in priority value ranking set 412. If, for example, all of priority values in lowest set of priority values 425 are unique up to limit value 429, then each subnet manager and corresponding node can be included in set of standby subnet managers 428. In this embodiment, GUID of any of the subnet managers do not need to be ranked.

In another embodiment, if lowest set of priority values 425 includes identical priority value set 417, where all of nodes in identical priority value set 417 can be included in lowest set of priority values 425 without exceeding limit value 429, then no further ranking of identical priority value set 417 is necessary. In this case, each subnet manager and corresponding node in identical priority value set 417 can be included in set of standby subnet managers 428.

In still another embodiment, lowest set of priority values 425 can include an identical priority value set 417 that has a priority value and a number of nodes such that all of the nodes in identical priority value set 417 cannot be included in lowest set of priority values 425 without violating limit value 529 (i.e. a priority value of identical priority value set 17 is at the cut-off point for lowest set of priority values 425). In this embodiment, subnet managers and corresponding nodes in identical priority value set 417 can be further ranked from highest GUID 422 to lowest GUID 420 in globally unique identifier ranking set 414. Subnet managers can then be further selected from the globally unique identifier ranking set 414 to be included in set of standby subnet managers 428 by selecting the subnet manager from each of the plurality of nodes within globally unique identifier ranking set 414 having a highest set of globally unique identifiers 427 until limit value 429 is reached.

Once set of standby subnet managers 428 is selected, which standby subnet manager that assumes master subnet manager function 206 can be selected based on the master subnet manager function handover/failover mechanism described in InfiniBand® Architecture specification release 1.1 or later. Any other algorithm can be used to select which of set of standby subnet managers assume master subnet manager function and still be within the scope of the invention.

Figure 5:
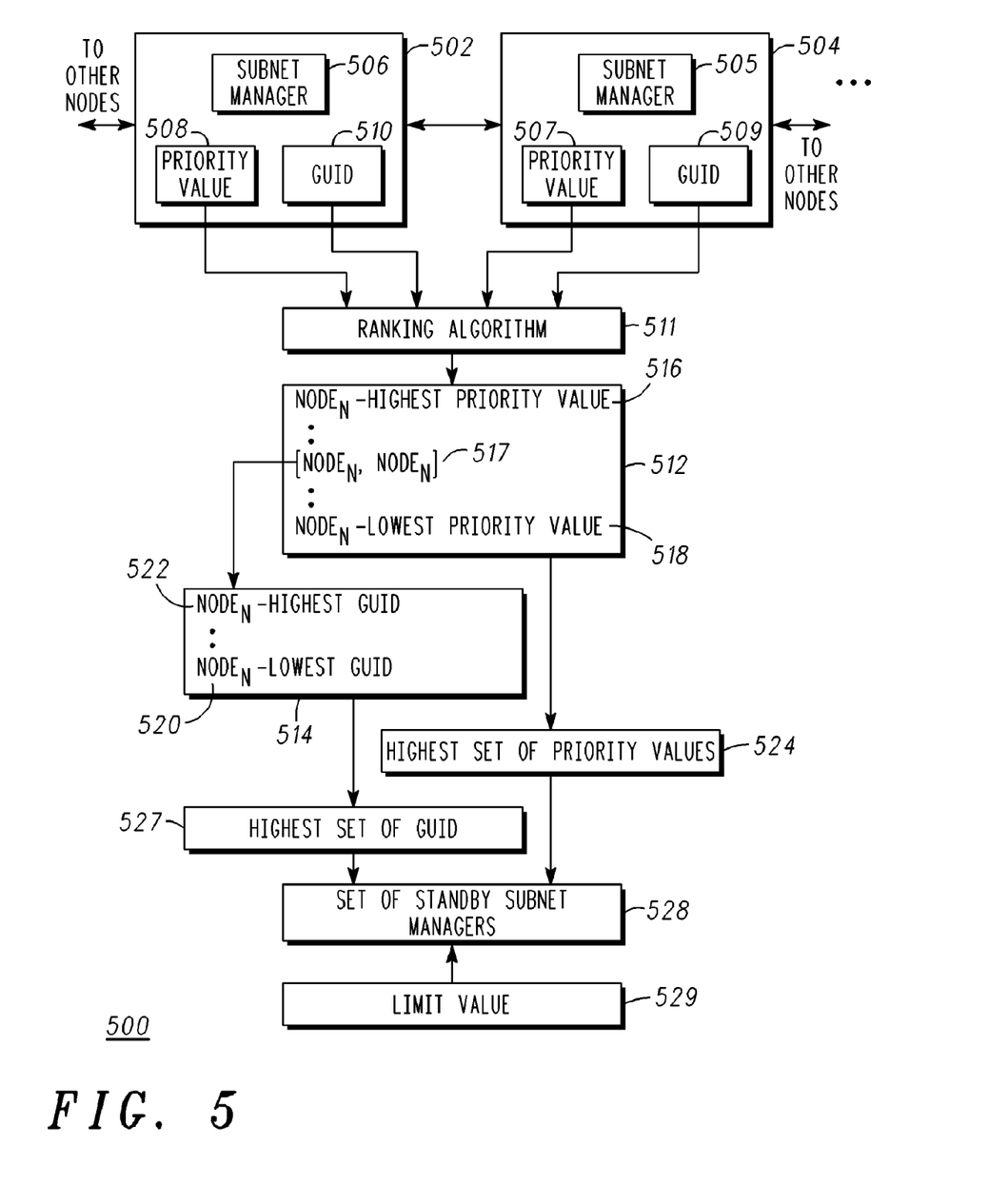
FIG. 5 depicts a block diagram of an InfiniBand® architecture subnet according to yet another embodiment of the invention.

FIG. 5 depicts a block diagram of an InfiniBand® architecture subnet 500 according to another embodiment of the invention. In the embodiment depicted in FIG. 5, only two nodes are shown. However, InfiniBand® architecture subnet 500 can include any number of nodes.

In an embodiment, first node includes subnet manager 506, priority value 508 and globally unique identifier 510. Second node 504 includes subnet manager 505, priority value 507 and globally unique identifier 509. In an embodiment, InfiniBand® architecture subnet 500 includes ranking algorithm 511 to select which of the subnet managers in InfiniBand® architecture subnet 500 are included in set of standby subnet managers 528.

In an embodiment, ranking algorithm 511 creates priority value ranking set 512 where plurality of nodes and their corresponding subnet managers in InfiniBand® architecture subnet 500 are ranked according to their respective priority values. Node$_N$ represents a node in InfiniBand® architecture subnet 500. In the embodiment shown, each node is ranked from highest priority value 516 to lowest priority value 518.

In the event that, for example and without limitation, priority value 508 of first node 502 is identical to priority value 507 of second node 504, an identical priority value set 517 can be created that includes first node 502 and second node 504. In an embodiment, an identical priority value set 517 can be created for each group of nodes that have identical priority values. In an embodiment, each identical priority value set 517 can be further ranked from a highest globally unique identifier 522 to a lowest globally unique identifier 520 in globally unique identifier ranking set 514.

In an embodiment, set of standby subnet managers 528 can be selected based on the priority value and the globally unique identifier of each of the plurality of nodes in InfiniBand® architecture subnet 500. For example, and without limitation, a limit value 529 can be placed on the quantity of subnet managers in InfiniBand® architecture subnet 500 that can be selected to be in set of standby subnet managers 528. If the number of active subnet managers in InfiniBand® architecture subnet 500 is greater than the limit value 529, then set of standby subnet managers 528 can be selected based on the priority value and, if necessary, the globally unique identifier of each of the plurality of nodes in Infini-Band® architecture subnet 500. In this embodiment, any subnet managers that are not included in set of standby subnet managers can be made inactive. The deactivation can either be local or controlled by the master subnet manager function. If there are fewer active subnet managers in InfiniBand® architecture subnet 500 than limit value 529, then additional subnet managers can be made active (if available on the subnet) and included in set of standby subnet managers 528. Reactivation can be accomplished either using the master subnet manager function over Infini-Band® architecture subnet 500 or out of band over a communication means other than InfiniBand® architecture subnet 500. In an embodiment, both deactivation and reactivation of subnet managers can be accomplished using standard InfiniBand® architecture mechanisms.

In an embodiment, subnet managers can be selected to be one of set of standby subnet managers 528 by selecting the subnet manager from each of the plurality of nodes with a highest set of priority values 524. The highest set of priority values 524 can include nodes and respective subnet managers, up to the limit value 529, having the highest priority values in priority value ranking set 512. If, for example, all of priority values in highest set of priority values 524 are unique up to limit value 529, then each subnet manager and corresponding node can be included in set of standby subnet managers 528. In this embodiment, GUID of any of the subnet managers do not need to be ranked.

In another embodiment, if highest set of priority values 524 includes identical priority value set 517, where all of nodes in identical priority value set 517 can be included in highest set of priority values 524 and set of standby subnet managers 528 without exceeding limit value 529, then no further ranking of identical priority value set 517 is necessary. In this case, each subnet manager and corresponding node in identical priority value set 517 can be included in set of standby subnet managers 528.

In still another embodiment, highest set of priority values 524 can include an identical priority value set 517 that has a priority value and a number of nodes such that all of the nodes in identical priority value set 517 cannot be included in highest set of priority values 524 without violating limit value 529 (i.e. a priority value of identical priority value set 517 is at the cut-off point for highest set of priority values 524). In this embodiment, subnet managers and corresponding nodes in identical priority value set 517 can be further ranked from highest GUID 522 to lowest GUID 520 in globally unique identifier ranking set 514. Subnet managers can then be further selected from the globally unique identifier ranking set 514 to be included in set of standby subnet managers 528 by selecting the subnet manager from each of the plurality of nodes within globally unique identifier ranking set 514 having a highest set of globally unique identifiers 527.

Once set of standby subnet managers 528 is selected, which standby subnet manager that assumes master subnet manager function 206 can be selected based on the master subnet manager function handover/failover mechanism described in InfiniBand® Architecture specification release 1.1 or later. Any other algorithm can be used to select which of set of standby subnet managers assume master subnet manager function and still be within the scope of the invention.

Figure 6:
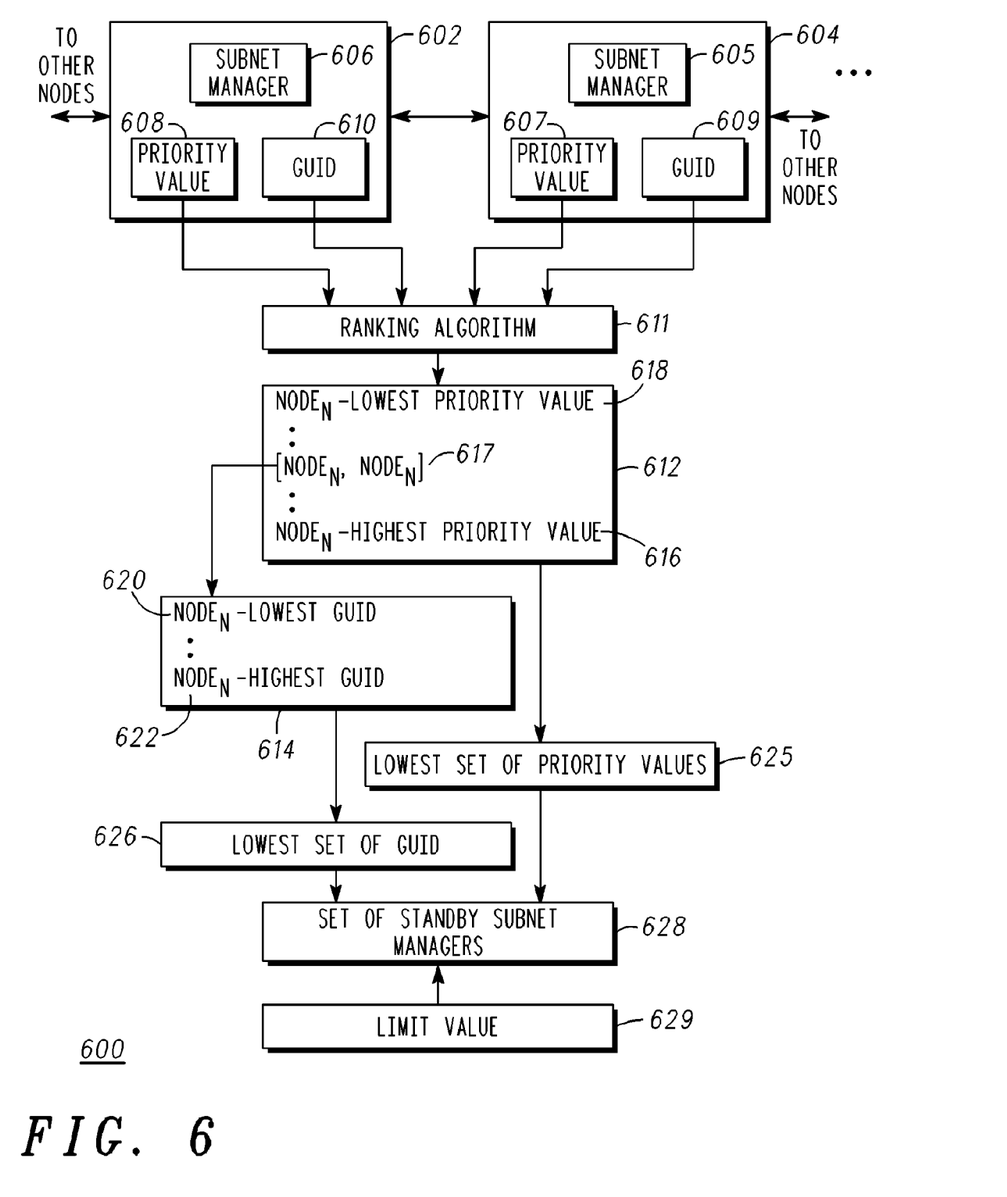
FIG. 6 depicts a block diagram of an InfiniBand® architecture subnet according to still another embodiment of the invention.

FIG. 6 depicts a block diagram of an InfiniBand® architecture subnet 600 according to another embodiment of the invention. In the embodiment depicted in FIG. 6, only two nodes are shown. However, InfiniBand® architecture subnet 600 can include any number of nodes.

In an embodiment, first node includes subnet manager 606, priority value 608 and globally unique identifier 610. Second node 604 includes subnet manager 605, priority value 607 and globally unique identifier 609. In an embodiment, InfiniBand® architecture subnet 600 includes ranking algorithm 611 to select which of the subnet managers in InfiniBand® architecture subnet 600 are included in set of standby subnet managers 628.

In an embodiment, ranking algorithm 611 creates priority value ranking set 612 where plurality of nodes and their corresponding subnet managers in InfiniBand® architecture subnet 600 are ranked according to their respective priority values. Node$_N$ represents a node in InfiniBand® architecture subnet 600. In the embodiment shown, each node is ranked from lowest priority value 618 to highest priority value 616.

In the event that, for example and without limitation, priority value 608 of first node 602 is identical to priority value 607 of second node 604, an identical priority value set 617 can be created that includes first node 602 and second node 604. In an embodiment, an identical priority value set 617 can be created for each group of nodes that have identical priority values. In an embodiment, each identical priority value set 617 can be further ranked from a lowest globally unique identifier 620 to a highest globally unique identifier 622 in globally unique identifier ranking set 614.

In an embodiment, set of standby subnet managers 628 can be selected based on the priority value and the globally unique identifier of each of the plurality of nodes in Infini-Band® architecture subnet 600. For example, and without limitation, a limit value 629 can be placed on the quantity of subnet managers in InfiniBand® architecture subnet 600 that can be selected to be in set of standby subnet managers 628. If the number of active subnet managers in InfiniBand® architecture subnet 600 is greater than the limit value 629, then set of standby subnet managers 628 can be selected based on the priority value and, if necessary, the globally unique identifier of each of the plurality of nodes in Infini-Band® architecture subnet 600. In this embodiment, any subnet managers that are not included in set of standby subnet managers can be made inactive. The deactivation can either be local or controlled by the master subnet manager function. If there are fewer active subnet managers in InfiniBand® architecture subnet 600 than limit value 629, then additional subnet managers can be made active (if available on the subnet) and included in set of standby subnet managers 628. Reactivation can be accomplished either using the master subnet manager function over Infini-Band® architecture subnet 300 or out of band over a communication means other than InfiniBand® architecture subnet 300. In an embodiment, both deactivation and reactivation of subnet managers can be accomplished using standard InfiniBand® architecture mechanisms.

In an embodiment, subnet managers can be selected to be one of set of standby subnet managers 628 by selecting the subnet manager from each of the plurality of nodes with a lowest set of priority values 625. The lowest set of priority values 625 can include nodes and respective subnet managers, up to the limit value 629, having the lowest priority values in priority value ranking set 612. If, for example, all of priority values in lowest set of priority values 625 are unique up to limit value 629, then each subnet manager and corresponding node can be included in set of standby subnet managers 628. In this embodiment, GUID of any of the subnet managers do not need to be ranked.

In another embodiment, if lowest set of priority values 625 includes identical priority value set 617, where all of nodes in identical priority value set 617 can be included in lowest set of priority values 625 and set of standby subnet managers 628 without exceeding limit value 629, then no further ranking of identical priority value set 617 is necessary. In this case, each subnet manager and corresponding node in identical priority value set 617 can be included in set of standby subnet managers 628.

In still another embodiment, lowest set of priority values 625 can include an identical priority value set 617 that has a priority value and a number of nodes such that all of the nodes in identical priority value set 617 cannot be included in lowest set of priority values 625 without violating limit value 629 (i.e. a priority value of identical priority value set 617 is at the cut-off point for lowest set of priority values 625). In this embodiment, subnet managers and corresponding nodes in identical priority value set 617 can be further ranked from lowest GUID 620 to highest GUID 622 in globally unique identifier ranking set 314. Subnet managers can then be further selected from the globally unique identifier ranking set 614 to be included in set of standby subnet managers 628 by selecting the subnet manager from each of the plurality of nodes within globally unique identifier ranking set 614 having a lowest set of globally unique identifiers 626 until limit value 629 is reached.

Once set of standby subnet managers 628 is selected, which standby subnet manager that assumes master subnet manager function 206 can be selected based on the master subnet manager function handover/failover mechanism described in InfiniBand® Architecture specification release 1.1 or later. Any other algorithm can be used to select which of set of standby subnet managers assume master subnet manager function and still be within the scope of the invention.

Figure 7:
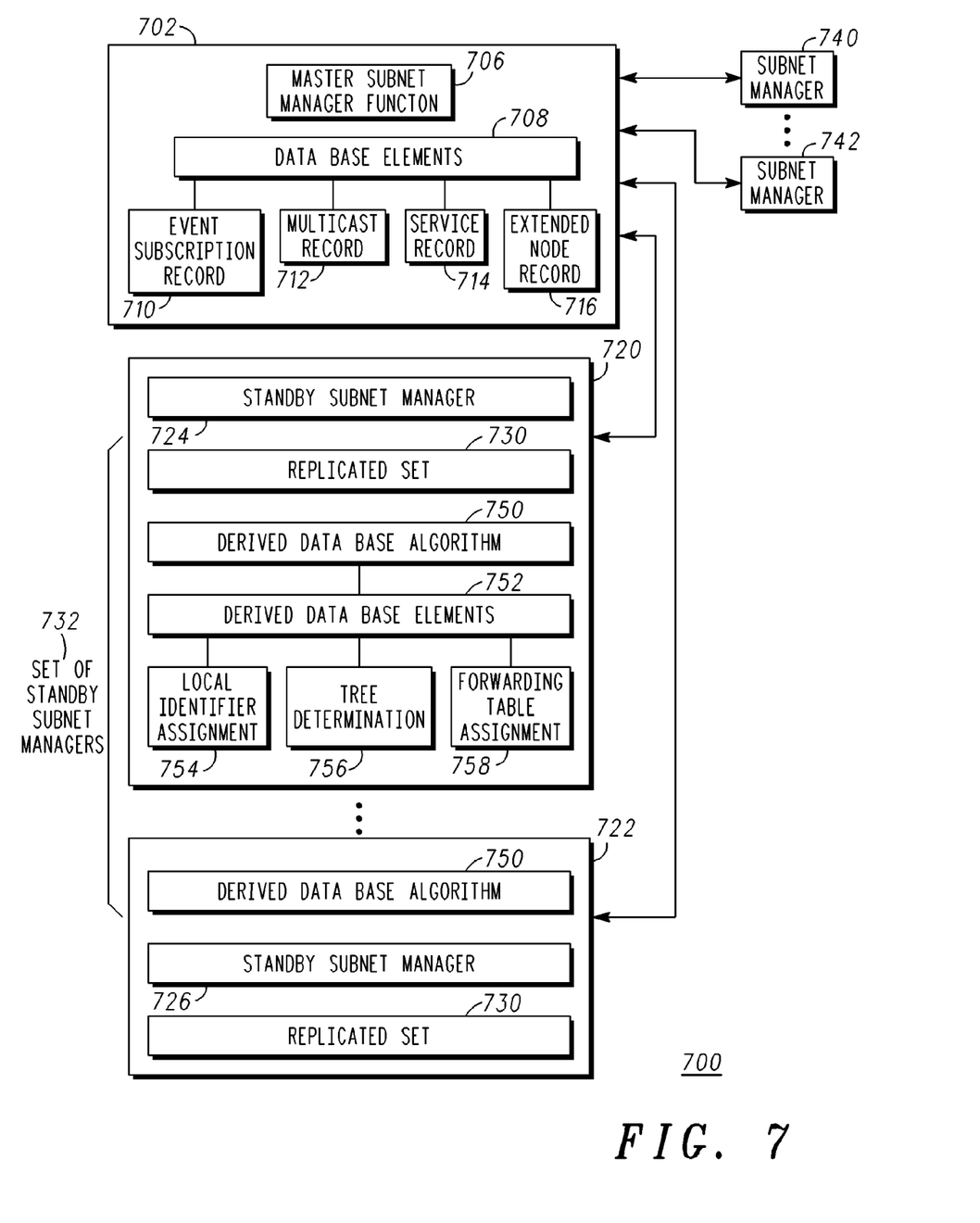
FIG. 7 illustrates a block diagram of an InfiniBand® architecture subnet according to an embodiment of the invention.

FIG. 7 illustrates a block diagram of an InfiniBand® architecture subnet 700 according to an embodiment of the invention. As shown in FIG. 7, InfiniBand® architecture subnet 700 can include first node 702 having master subnet manager function 706. First node 702 can also include database elements 708, which can include persistent data and volatile data for InfiniBand® architecture subnet 700. In an embodiment, database elements can include event subscription 710, multicast record 712, service record 714 and extended node record 716.

In an embodiment in InfiniBand® architecture subnet 700, event subscription 710 identifies clients (including nodes, services, applications, and the like) interested in being notified of events occurring in InfiniBand® architecture subnet 700. Events can include, but are not limited to, link state changes, security events, multicast group events, and the like. In an embodiment, event subscription 710 can include InformInfoRecord as defined in the InfiniBand® Architecture specification release 1.1 or later.

Multicast record 712 can include, but is not limited to, records of multicast groups such as which entities in InfiniBand® architecture subnet 700 are members of which multicast group, and the like. In an embodiment, multicast record 712 can include MulticastMemberRecord as defined in the InfiniBand® Architecture specification release 1.1 or later.

Service record 714 can include, but is not limited to, records of registered services within InfiniBand® architecture subnet 700. Service records can include a service lease, which comprise the amount of time remaining for a particular service to be registered. In an embodiment, service record 714 can include ServiceRecord as defined in the InfiniBand® Architecture specification release 1.1 or later.

Extended node record 716 can include node names for any of the plurality of nodes in InfiniBand® architecture subnet 700. In an embodiment, node names can be persistent regardless of changes in a node's local identifier or local identifier's for ports of a node. Extended node record 716 can also include local identifiers for ports on each of plurality of nodes in InfiniBand® architecture subnet 700. Extended node record 716 is not specified in InfiniBand® Architecture specification release 1.1 or later.

InfiniBand® architecture subnet 700 can also include set of standby subnet managers 732 selected based on priority value and globally unique identifier as described in FIGS. 3–6. In an embodiment, set of standby subnet managers 732 include second node 720 having standby subnet manager 724 and third node 722 having standby subnet manager 726. In one embodiment, there are more subnet managers in InfiniBand® architecture subnet 700 than the allowable number of standby subnet managers. For example, subnet managers 740, 742 can be excluded from set of standby subnet managers 732.

In an embodiment of the invention, database elements 708 are updated by master subnet manager function 706 as elements within InfiniBand® architecture subnet 700 change. For example, service record 714 can be updated as a service lease expires or a new service lease is created, and the like. A replicated set 730 of database elements 708 can be created at each standby subnet manager 724, 726 in set of standby subnet managers 732. In an embodiment, replicated set 730 of database elements 708 are periodically updated so as to include the latest changes in database elements 708. Periodically updating can include updating in total, meaning all of the database elements 708, or incrementally, meaning any changed portion of database elements 708.

In an embodiment, master subnet manager function can be relinquished by first node 702 and a standby subnet manager included in set of standby subnet managers 732 assumes master subnet manager function 706. In this embodiment, the standby manager included in the set of standby subnet managers 732 assuming master subnet manager function 706 can use replicated set 730 of database elements 708 to initialize InfiniBand® architecture subnet 700. In an embodiment, initializing can include reinitializing InfiniBand® architecture subnet 700 after migration of master subnet manager function 706 to one of set of standby subnet managers 732.

In another embodiment, the standby subnet manager in the set of standby subnet managers 732 that assumes master subnet manager function 706 can use replicated set 730 of database elements 708 to manage InfiniBand® architecture subnet 700. Managing InfiniBand® architecture subnet can include, for example and without limitation, discovering a topology of InfiniBand® architecture subnet, establishing possible paths among end nodes, assigning local identifier to each node in InfiniBand® architecture subnet, sweeping the subnet and discovering and managing changes in topology of InfiniBand® architecture subnet, and the like. In this embodiment, disruption to InfiniBand® architecture subnet 700 is minimized in the transition of master subnet manager function 706 to one of the set of standby subnet managers 732, since the most current database elements 708 are included in replicated set 730 of database elements 708 at set of standby subnet managers 732.

In an embodiment, replicating database elements 708 to set of standby subnet managers 732 can occur "out of band"

(i.e. outside of the InfiniBand® architecture subnet) for example using Ethernet, any other network other than InfiniBand® architecture, and the like. In another embodiment, replicating database elements 708 to set of standby subnet managers 732 can occur using InfiniBand® architecture subnet 700 (i.e. "inband"). An example of this embodiment, and not limiting of the invention, is creating replicated set 730 of database elements 708 using reliable multi-packet transaction protocol (RMPP), reliable connection transport service (RC), reliable datagram transport service (RD), and the like, as defined in the InfiniBand® Architecture specification release 1.1 or later.

In an embodiment, any node in InfiniBand® architecture subnet 700 can include derived database algorithm 750. In particular, set of standby subnet managers 732 can include derived database algorithm 750. In an embodiment, derived database algorithm can compute derived database elements 752 independent of which of the set of standby subnet managers 732 assumes master subnet manager function 706.

Derived database elements 752 can be database elements used to initialize, reinitialize, manage, and the like, InfiniBand® architecture subnet 700. Unlike replicated set 730 of database elements 708, derived database elements 752 are not copied from a first node 702 having master subnet manager function 706. In an embodiment, derived database elements 752 are computed by derived database algorithm 750 upon master subnet manager function 706 migrating to, for example, second node 720. In other words, when standby subnet manager 724 assumes master subnet manager function 706, derived database algorithm 750 can compute derived database elements 752. Second node 720 can, for example and without limitation, be a member of set of standby subnet managers 732. In this embodiment, derived database elements 752 are identical regardless of which one of the plurality of subnet managers assumes master subnet manager function 706. Derived database elements 752 are computed deterministically regardless of which one of the plurality of subnet managers assumes master subnet manager function 706.

As an example of an embodiment of the invention, derived database elements 752 can include local identifier assignment 754, tree determination 756, forwarding table assignment 758, and the like. In an embodiment, local identifier assignment 754 can comprise derived database algorithm 750 computing the local identifier for each port on each node in InfiniBand® architecture subnet 700. In order for derived database algorithm 750 to obtain the same local identifier assignments 754 regardless of where in InfiniBand® architecture subnet 700 they are calculated, derived database algorithm 750 can compute local identifiers by processing nodes and ports in ascending order, descending order based on global unique identification (GUID) and port numbers for a given node. In an embodiment, any of derived database elements 752 can include PortInfoRecords as defined in the InfiniBand® Architecture specification release 1.1 or later.

In an embodiment, tree determination 756 can comprise derived database algorithm 750 computing a root of a tree for any the plurality of nodes in InfiniBand® architecture subnet 700. The root of a tree determination can be for a linear (unicast) tree determination or a multicast tree determination. As an example, the InfiniBand® Architecture specification release 1.1 or later defines multicast groups, the members of which are set up to receive multicast packets addressed to the group using multicast forwarding tables in any of the plurality of nodes. Multicast forwarding tables can be derived from the multicast tree, where the multicast tree, as is known in the art, is a set of paths from one node to any of a plurality of destination nodes with the elimination of any loops within InfiniBand® architecture subnet 700. In other words, a multicast tree can be used to initialize multicast forwarding tables in InfiniBand® architecture subnet 700.

In example of an embodiment, selection of a root for tree determination can be made using an ordered set of node GUID and port numbers at each node. For example, the root of the tree can be the first, last or middle member of the ordering. In another embodiment, selection of a root for tree determination can be made using an ordering of port GUID's for each node. The multicast tree selected can be the unicast tree computed for unicast/primary paths for the root member port on a node as the destination. In addition, derived database algorithm can prune a multicast tree such as to remove all ports in the subnet that are not part of a multicast group.

In an embodiment, forwarding table assignment 758 can comprise derived database algorithm 750 computing linear (unicast) forwarding table (LFT) assignments and/or multicast forwarding table (MFT) assignments for any of the plurality of nodes in InfiniBand® architecture subnet 700, particular switches in the subnet. As an example of an embodiment, primary paths for initializing forwarding tables can be computed using Dijkstra's all-sources-single destination or all-destinations-single-source algorithm over an ordered set of ports for each node in InfiniBand® architecture subnet 700.

In another example of an embodiment, derived database algorithm 750 can compute balanced paths for initializing forwarding tables by giving less preference to links between nodes that belong to the primary paths (unicast tree) already computed for another destination port. In yet another example of an embodiment, derived database algorithm 750 can compute balanced paths for initializing forwarding tables by computing a single unicast tree for determining paths between each pair of nodes/ports in an InfiniBand® architecture subnet 700, but selecting an alternate link parallel and between the same nodes as the link in the unicast tree for a destination port such that the selected link is used the least number of times in primary paths computed thus far. In still another example of an embodiment, derived database algorithm 750 can compute alternate paths for initializing forwarding tables using ordered sets of nodes and assigning costs to links of the primary paths so that they are less preferred for use within an alternate path between nodes.

In an embodiment, upon standby subnet manager 724 assuming master subnet manager function 706, master subnet manager function 706 can use derived database algorithm 750 to compute derived database elements 752. Master subnet manager function 706 can then use replicated set 730 of database elements 708 and derived database elements 752 to initialize InfiniBand® architecture subnet 700. In another embodiment, master subnet manager function 706 can use replicated set 730 of database elements 708 and derived database elements 752 to reinitialize InfiniBand® architecture subnet 700. In yet another embodiment, master subnet manager function 706 can use replicated set 730 of database elements 708 and derived database elements 752 to manage InfiniBand® architecture subnet 700.

Figure 8:
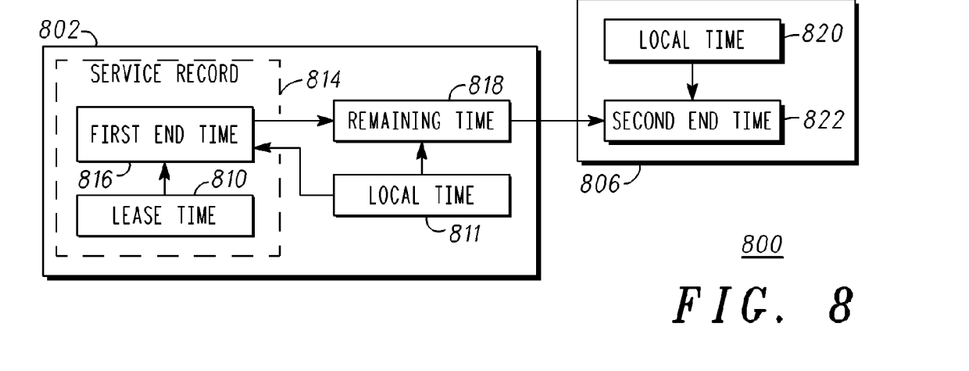
FIG. 8 illustrates a block diagram according to an embodiment of the invention.

FIG. 8 illustrates a block diagram 800 according to an embodiment of the invention. As shown in FIG. 8, service record 814 includes first end time 816, which can be an expiration time for a service lease included in service record 814. In an embodiment, a service lease can have an infinite duration, and hence a first end time 816 of "never." When a client registers the service via a service record 814, the service lease, quantified as a lease time 810 is translated into first end time 816 using the local time 811 on the first node 802 where the master subnet manager function currently resides. When master subnet manager function 706 replicates to a standby manager 806 included in set of standby subnet managers, first end time 816 is converted to remaining time 818 by using local time 811 at first node 802. Remaining time 818 can be a time remaining before expiration of the service lease (lease time). In another embodiment, remaining time 818 can have an infinite value if it is associated with a service lease of infinite duration. The standby manager 806 that is assuming master subnet manager function 706 can convert remaining time 818 to second end time 822 where second end time 822 is a function of remaining time and local time 820 at standby subnet manager. In an embodiment, second end time 822 is derived by adding remaining time 818 to local time 820. In an embodiment, second end time 822 can have a "never" value if it is associated with a service lease of infinite duration. In this manner, time does not need to be synchronized between nodes involved in this transfer in InfiniBand® architecture subnet.

In another embodiment, master subnet manager function 706 at first node 802 can periodically decrement lease time 810 as the service lease at service record 814 expires. When master subnet manager function 706 replicates to a standby manager 806 included in set of standby subnet managers, lease time 810 can become remaining time 818. Remaining time 818 can be a time remaining before expiration of the service lease (lease time). The standby manager 806 that is assuming master subnet manager function 706 can convert remaining time 818 to second end time 822 where second end time 822 is a function of remaining time and local time 820 at standby subnet manager. In an embodiment, second end time 822 is derived by adding remaining time 818 to local time 820.

Figure 9:
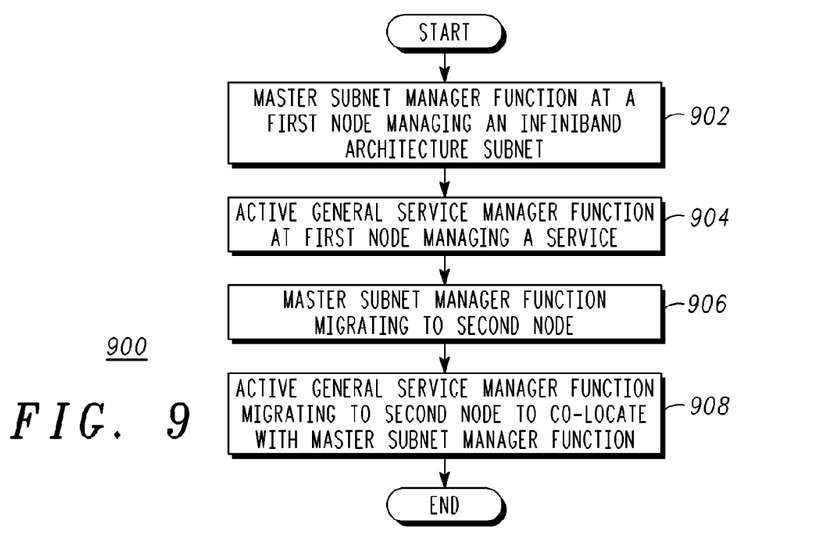
FIG. 9 is a flow diagram illustrating an embodiment of the invention.

FIG. 9 is a flow diagram 900 illustrating an embodiment of the invention. In step 902, a master subnet manager function manages the InfiniBand® architecture subnet, where the master subnet manager function is located at a first node of the InfiniBand® architecture subnet. Managing InfiniBand® architecture subnet can include initializing the InfiniBand® architecture subnet, discovering a topology of InfiniBand® architecture subnet, establishing possible paths among end nodes, assigning local identifier to each node in InfiniBand® architecture subnet, sweeping the subnet and discovering and managing changes in topology of InfiniBand® architecture subnet, and the like.

In step 904, an active general service manager function manages a service within the InfiniBand® architecture subnet, where the active general service manager function is located at the first node. In step 906, the master subnet manager function migrates to a second node. In an embodiment, migrating can include a standby subnet manager at the second node assuming the master subnet manager function, and the like. Step 908 includes the active general service manager function migrating to the second node to co-locate with the master subnet manager function. In an embodiment, migrating can include a general service manager at the second node assuming the active general service manager function.

Figure 10:
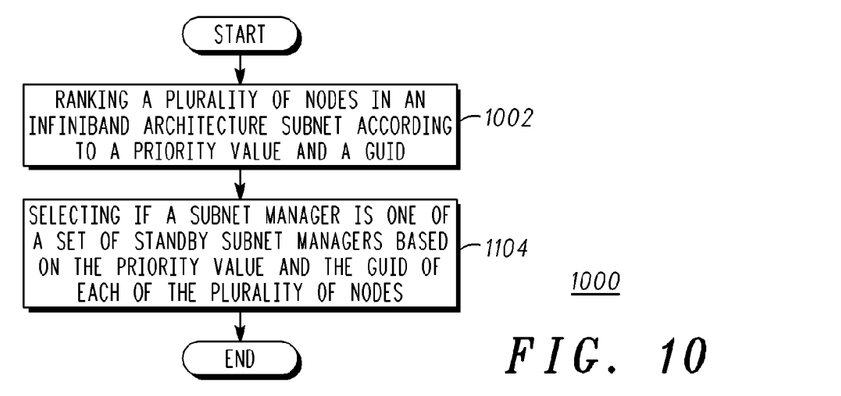
FIG. 10 is a flow diagram illustrating another embodiment of the invention.

FIG. 10 is a flow diagram 1000 illustrating another embodiment of the invention. Step 1002 includes ranking each of the plurality of nodes according to the priority value and the globally unique identifier. In one embodiment, ranking each of the plurality of nodes comprises ranking each of the plurality of nodes from a highest priority value to a lowest priority value, and wherein if the priority value for a first node is identical to the priority value of a second node, further ranking the first node and the second node from a lowest globally unique identifier to a highest globally unique identifier.

In another embodiment, ranking each of the plurality of nodes comprises ranking each of the plurality of nodes from a lowest priority value to a highest priority value, and wherein if the priority value for a first node is identical to the priority value of a second node, further ranking the first node and the second node from a highest globally unique identifier to a lowest globally unique identifier.

In yet another embodiment, ranking each of the plurality of nodes comprises ranking each of the plurality of nodes from a highest priority value to a lowest priority value, and wherein if the priority value for a first node is identical to the priority value of a second node, further ranking the first node and the second node from a highest globally unique identifier to a lowest globally unique identifier.

In still another embodiment, ranking each of the plurality of nodes comprises ranking each of the plurality of nodes from a lowest priority value to a highest priority value, and wherein if the priority value for a first node is identical to the priority value of a second node, further ranking the first node and the second node from a lowest globally unique identifier to a highest globally unique identifier.

Step 1004 includes selecting if the subnet manager is included in a set of standby subnet managers based on the priority value and the globally unique identifier of each of the plurality of nodes. In one embodiment, selecting comprises selecting the subnet manager to be included in the set of standby subnet managers by selecting the subnet manager from each of the plurality of nodes with a highest set of priority values. In another embodiment, selecting comprises selecting the subnet manager to be included in the set of standby subnet managers by selecting the subnet manager from each of the plurality of nodes with a lowest set of priority values.

In yet another embodiment, selecting comprises selecting the subnet manager to be included in the set of standby subnet managers by selecting the subnet manager from each of the plurality of nodes with a lowest set of globally unique identifiers when the priority value is the same. In still another embodiment, selecting comprises selecting the subnet manager to be included in the set of standby subnet managers by selecting the subnet manager from each of the plurality of nodes with a highest set of globally unique identifiers when the priority value is the same.

Figure 11:
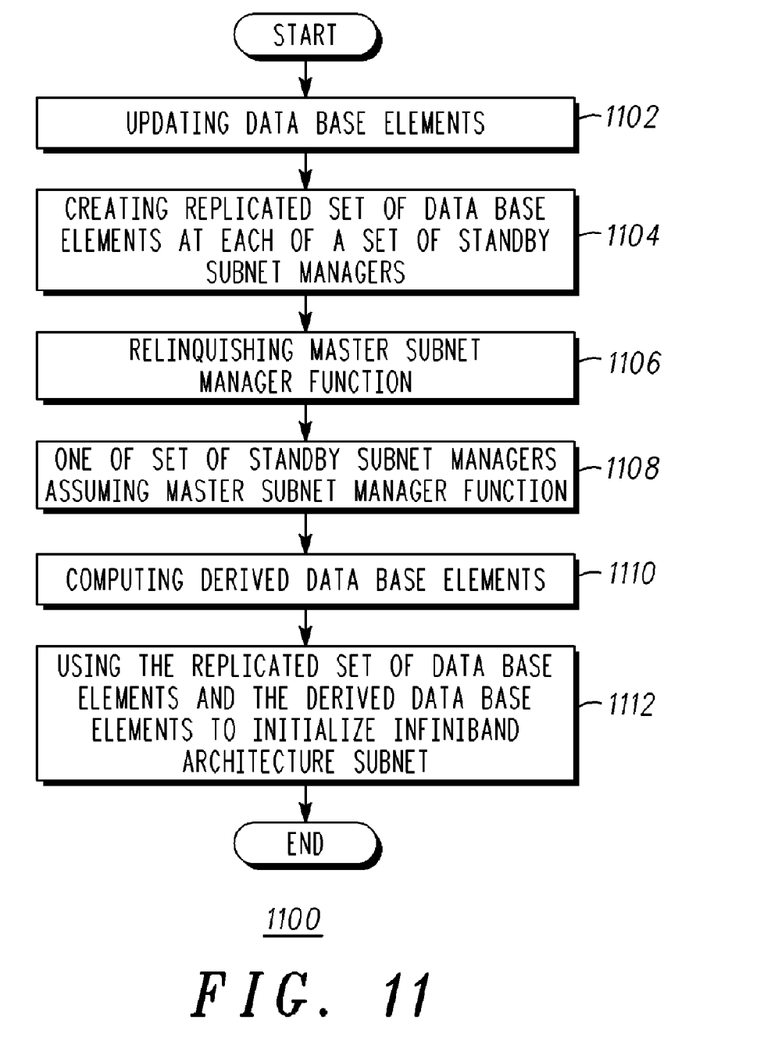
FIG. 11 is a flow diagram illustrating yet another embodiment of the invention.

FIG. 11 is a flow diagram 1100 illustrating yet another embodiment of the invention. Step 1102 includes a master subnet manager function updating database elements of an InfiniBand® architecture subnet. Database elements can comprise an event subscription, multicast record, service record, extended node record, and the like. Step 1104 includes creating a replicated set of the database elements at each of a set of standby subnet managers using the InfiniBand® architecture subnet. In an embodiment, step 1104 includes creating the replicated set of the database elements at each of a set of standby subnet managers using a reliable multi-packet transaction protocol.

Step 1106 includes relinquishing the master subnet manager function by a subnet manager. Step 1108 includes a standby subnet manager included in the set of standby subnet managers assuming the master subnet manager function after the master subnet manager function has been relinquished. Step 1110 includes computing derived database elements independent of which of plurality of subnet managers assumes master subnet manager function. In this embodiment, derived database elements are identical regardless of which one of the plurality of subnet managers assumes master subnet manager function. Derived database elements are computed deterministically regardless of which one of the plurality of subnet managers assumes master subnet manager function. Step 1112 includes the standby subnet manager included in the set of standby subnet managers that assumes the master subnet manager function using the replicated set of the database elements and the derived database elements to initialize the InfiniBand® architecture subnet. In an embodiment, initializing can include reinitializing InfiniBand® architecture subnet after migration of master subnet manager function to one of set of standby subnet managers.

In another embodiment, the standby subnet manager in the set of standby subnet managers that assumes master subnet manager function can use replicated set of database elements to manage InfiniBand® architecture subnet. Managing InfiniBand® architecture subnet can include, for example and without limitation, discovering a topology of InfiniBand® architecture subnet, establishing possible paths among end nodes, assigning local identifier to each node in InfiniBand® architecture subnet, sweeping the subnet and discovering and managing changes in topology of InfiniBand® architecture subnet, and the like.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. An InfiniBand architecture computer subnet, comprising:
   a master subnet manager function;
   database elements of the InfiniBand architecture computer subnet, wherein the master subnet manager function updates the database elements;
   a replicated set of the database elements; and
   a set of standby subnet managers, wherein the replicated set of the database elements is created at each of the set of standby subnet managers, wherein a standby subnet manager included in the set of standby subnet managers assumes the master subnet manager function, and wherein the standby subnet manager included in the set of standby subnet managers that assumes the master subnet manager function initializes the InfiniBand architecture computer subnet using the replicated set of the database elements wherein the replicated set of database elements comprises a service record and wherein the service record comprises a lease time, wherein the master subnet manager function converts the lease time to a first end time, wherein the master subnet manager function converts the first end time to a remaining time, wherein the standby subnet manager included in the set of standby subnet manager converts the remaining time and a local time at the standby subnet manager included in the set of standby subnet managers.

2. The computer subnet of claim 1, wherein the standby subnet manager included in the set of standby subnet managers that assumes the master subnet manager function reinitializes the computer subnet.

3. The computer subnet of claim 1, wherein the standby subnet manager included in the set of standby subnet managers that assumes the master subnet manager function manages the computer subnet using the replicated set of the database elements.

4. The computer subnet of claim 1, wherein the replicated set of the database elements is created at each of the set of standby subnet managers out of band of the InfiniBand architecture subnet.

5. The computer subnet of claim 1, wherein the replicated set of the database elements is created at each of the set of standby subnet managers inband on the computer subnet.

6. The computer subnet of claim 5, wherein the replicated set of the database elements is created at each of the set of standby subnet managers using reliable multi-packet transaction protocol.

7. The computer subnet of claim 5, wherein the replicated set of the database elements is created at each of the set of standby subnet managers using reliable connection transport service.

8. The computer subnet of claim 5, wherein the replicated set of the database elements is created at each of the set of standby subnet managers using reliable datagram transport service.

9. The computer subnet of claim 1, wherein the replicated set of the database elements comprises an event subscription.

10. The computer subnet of claim 1, wherein the replicated set of the database elements comprises a multicast record.

11. The computer subnet of claim 10, wherein the master subnet manager function periodically decrements a lease time, wherein the lease time becomes a remaining time, wherein the standby subnet manager included in the set of standby subnet managers converts the remaining time to a second end time, and wherein the second end time is a function of the remaining time and a local time at the standby subnet manager included in the set of standby subnet managers.

12. The computer subnet of claim 1, wherein the replicated set of the database elements comprises an extended node record.

13. The computer subnet of claim 1, wherein the set of standby subnet managers is selected based on a priority value and a globally unique identifier.

14. The computer subnet of claim 1, wherein the replicated set of the database elements are periodically updated.

15. An InfiniBand architecture computer node, comprising:
   a master subnet manager function; and
   database elements of an InfiniBand architecture computer subnet, wherein the master subnet manager function updates the database elements, wherein the master subnet manager function initiates creation of a replicated set of database elements at a set of standby subnet managers, wherein a standby subnet manager included in the set of standby subnet managers assumes the master subnet manager function, and wherein the standby subnet manager included in the set of standby subnet managers that assumes the master subnet manager function initializes the computer subnet using the replicated set of the database elements wherein the service record comprises a lease time, wherein the master subnet manager function converts the lease time to a first end time, wherein the master subnet manager function converts the first end time to a remaining time, wherein the standby subnet manager included in the set of standby subnet managers converts the remaining time to a second end time, and wherein the second end time is a function of the remaining time and a local time at the standby subnet manager included in the set of standby subnet managers wherein the master subnet manager function periodically decrements a lease time, wherein the lease time becomes a remaining time, wherein the standby subnet manager included in the set of standby subnet managers converts the remaining time to a second end time, and wherein the second end time is a function of the remaining time and a local time at the standby subnet manager included in the set of standby subnet managers.

16. The computer node of claim 15, wherein the standby subnet manager included in the set of standby subnet managers that assumes the master subnet manager function reinitializes the computer subnet.

17. The computer node of claim 15, wherein the standby subnet manager included in the set of standby subnet managers that assumes the master subnet manager function manages the computer subnet using the replicated set of the database elements.

18. The computer node of claim 15, wherein the replicated set of the database elements is created at each of the set of standby subnet managers out of band of the computer subnet.

19. The computer subnet of claim 15, wherein the replicated set of the database elements is created at each of the set of standby subnet managers inband on the computer subnet.

20. The computer node of claim 19, wherein the replicated set of the database elements is created at each of the set of standby subnet managers using reliable multi-packet transaction protocol.

21. The computer node of claim 19, wherein the replicated set of the database elements is created at each of the set of standby subnet managers using reliable connection transport service.

22. The computer node of claim 19, wherein the replicated set of the database elements is created at each of the set of standby subnet managers using reliable datagram transport service.

23. The computer node of claim 15, wherein the replicated set of the database elements comprises an event subscription.

24. The computer node of claim 15, wherein the replicated set of the database elements comprises a multicast record.

25. The computer node of claim 15, wherein the replicated set of the database elements comprises a service record.

26. The computer node of claim 15, wherein the replicated set of the database elements comprises an extended node record.

27. An InfiniBand architecture computer node comprising a computer-readable storage medium containing computer instructions for instructing a processor to perform a method of replicating database elements in a computer subnet, the instructions comprising:
   a master subnet manager function updating database elements of the computer subnet;
   creating a replicated set of the database elements at each of a set of standby subnet managers;
   a standby subnet manager included in the set of standby subnet managers assuming the master subnet manager function; and
   the standby subnet manager included in the set of standby subnet managers that assumes the master subnet manager function initializing the computer subnet using the replicated set of the database elements wherein the replicated set of the database elements comprises a service record, wherein the service record comprising a lease time; the master subnet manager function converting the lease time to a first end time; the master subnet manager function converting the first end time to a remaining time; and the standby subnet manager included in the set of standby subnet managers converting the remaining time to a second end time, wherein the second end time is a function of the remaining time and a local time at the standby subnet manager included in the set of standby subnet managers.

28. The computer node of claim 27, wherein initializing comprises reinitializing the computer subnet.

29. The computer node of claim 27, further comprising the standby subnet manager included in the set of standby subnet managers that assumes the master subnet manager function managing the computer subnet using the replicated set of the database elements.

30. The computer node of claim 27, wherein creating comprises creating a replicated set of the database elements at each of a set of standby subnet managers out of band of the computer subnet.

31. The computer node of claim 27, wherein creating comprises creating a replicated set of the database elements at each of a set of standby subnet managers inband on the computer subnet.

32. The computer node of claim 31, wherein creating inband on the computer subnet comprises creating using reliable multi-packet transaction protocol.

33. The computer node of claim 31, wherein creating inband on the computer subnet comprises creating using reliable connection transport service.

34. The computer node of claim 31, wherein creating inband on the computer subnet comprises creating using reliable datagram transport service.

35. The computer node of claim 27, wherein the replicated set of the database elements comprises an event subscription.

36. The computer node of claim 27, wherein the replicated set of the database elements comprises a multicast record.

37. The computer node of claim 31 further comprising:
   the master subnet manager function periodically decrementing a lease time;
   the lease time becoming a remaining time; and
   the standby subnet manager included in the set of standby subnet managers converting the remaining time to a second end time, and wherein the second end time is a function of the remaining time and a local time at the standby subnet manager included in the set of standby subnet managers.

38. The computer node of claim 27, wherein the replicated set of the database elements comprises an extended node record.

39. The computer node of claim 27, further comprising selecting the set of standby subnet managers based on a priority value and a globally unique identifier.

40. The computer node of claim 27, wherein creating the replicated set of the database elements comprises periodically updating the replicated set of the database elements.

* * * * *